United States Patent [19]

Pivit et al.

[11] Patent Number: 4,553,189
[45] Date of Patent: Nov. 12, 1985

[54] SURGE PROTECTION DEVICE

[75] Inventors: Erich Pivit, Allmersbach; Helmut Setzer, Untermünkheim; Raimund König, Neumarkt/Opf.; Peter Distelrath, Backnang; Peter Hasse, Neumarkt/Opf.; Manfred Zeidler, Pilsach, all of Fed. Rep. of Germany

[73] Assignee: ANT Nachrichtentechnik GmbH, Backnang, Fed. Rep. of Germany

[21] Appl. No.: 486,482

[22] Filed: Apr. 19, 1983

[30] Foreign Application Priority Data

Apr. 20, 1982 [DE] Fed. Rep. of Germany ....... 3214400

[51] Int. Cl.$^4$ .............................................. H02H 9/04
[52] U.S. Cl. .................................... 361/119; 361/386
[58] Field of Search ................. 361/118, 119, 56, 111, 361/91, 104, 386

[56] References Cited

U.S. PATENT DOCUMENTS

| 3,686,533 | 8/1972 | Garnier et al. | 361/386 |
| 4,296,398 | 10/1981 | McGalliard | 361/104 X |
| 4,309,736 | 1/1982 | Lissillour | 361/119 |
| 4,389,695 | 6/1983 | Carpenter, Jr. | 361/104 X |

FOREIGN PATENT DOCUMENTS

| 25853 | 8/1980 | European Pat. Off. |
| 3140802 | of 0000 | Fed. Rep. of Germany. |
| 2445143 | 4/1976 | Fed. Rep. of Germany. |
| 3027469 | 2/1982 | Fed. Rep. of Germany. |
| 3101353 | 8/1982 | Fed. Rep. of Germany. |
| 3101354 | 8/1982 | Fed. Rep. of Germany. |
| 1326549 | 4/1963 | France. |
| 1403061 | 5/1965 | France. |
| 2214188 | 8/1974 | France. |
| 2374734 | 7/1978 | France. |
| 447377 | 3/1968 | Switzerland. |
| 1467631 | 3/1977 | United Kingdom. |
| 2046539 | 11/1980 | United Kingdom. |
| 2059197 | 4/1981 | United Kingdom. |

Primary Examiner—Reinhard J. Eisenzopf
Attorney, Agent, or Firm—Spencer & Frank

[57] ABSTRACT

An arrangement for protecting devices connected to transmission lines against excess or interfering voltages resulting from lightning strokes and the action of EMP or EMI, which arrangement includes a circuit board carrying connectors for establishing connections with such transmission lines and with the devices, lightning protection chokes connected in series between the transmission line connectors and the device connectors, first excess voltage arresters connected between the transmission line connectors and the chokes for effecting coarse overvoltage protection for the devices, second excess voltage arresters connected between the device connectors and the chokes for effecting fine overvoltage protection for the devices, and a network with frequency dependent behavior connected between the device connectors and the second excess voltage arresters, and a ground conductor constituted by a large-area metal plate oriented parallel to the circuit board.

12 Claims, 7 Drawing Figures

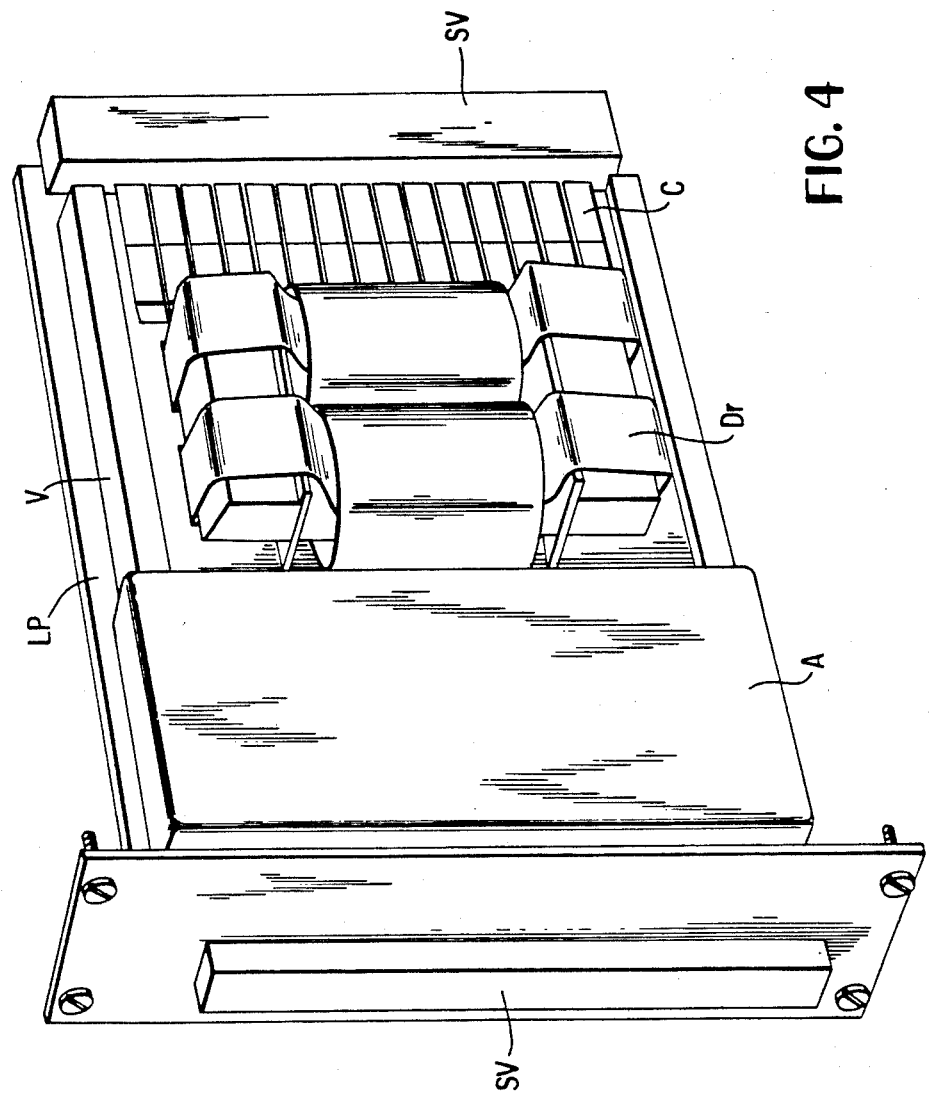

SURGE PROTECTION DEVICE

BACKGROUND OF THE INVENTION

The present invention relates to an arrangement for protecting devices connected to transmission lines against excess or interfering voltages, such as those produced by lightning strokes and EMI and EMP effects.

Such arrangements are known. For example, FRG Offenlegungschrift [Laid-open application] No. 3,027,469 discloses an arrangement for protecting a portable telecommunication station. It is the purpose of that arrangement to provide increased protection against damage by lightning strokes while the station remains easy to assemble and disassemble and employs grounding plates on which the vehicle to be protected is stationed.

SUMMARY OF THE INVENTION

It is an object of the present invention to provide an arrangement of the above-mentioned type in which increased protection is provided against excess voltages or interfering voltages in an inexpensive manner. A further object of the invention is to achieve this result with an arrangement which is of compact design without relinquishing good decoupling.

The above and other objects are achieved, according to the invention by the provision of an improved arrangement for protecting devices connected to transmission lines against excess or interfering voltages resulting from lightning strokes and the action of EMP or EMI, which arrangement includes first connecting means for establishing connections with such transmission lines, second connecting means for establishing connections with the devices, a ground conductor extending between the first and second connecting means, lightning protection chokes connected in series between the first and second connecting means to be interposed between the transmission lines and the devices, first excess voltage arresters connected to the connecting means for effecting coarse overvoltage protection for the devices, second excess voltage arresters connected to the connecting means for effecting fine overvoltage protection for the devices, and a network with frequency dependent behavior connected to the second connecting means and located between the second connecting means and the second excess voltage arresters. According to the invention, the arrangement further includes a circuit board carrying the arresters, the chokes and the network, the ground conductor is constituted by a large-area metal plate oriented parallel to the circuit board, the first excess voltage arresters are constructed to carry lightning-induced current, the first and second excess voltage arresters, the chokes and the network cooperate for protecting the devices against EMI influences, the first and second connecting means are disposed at respectively opposite sides of the circuit board, and, in the direction from the first connecting means to the second connecting means, there are arranged, in the order recited and close to one another, the first excess voltage arresters, the lightning protection chokes, the second excess voltage arresters and the network.

The advantages of the arrangement according to the present invention are that increased protection against excess voltages or interfering voltages from lightning, EMI (electromagnetic interference) or EMP (electromagnetic pulse) action is realized in an inexpensive manner with a compact design, good decoupling between the signal circuits on the one hand and the instrument signal inputs on the other hand being assured with respect to the path of the lightning.

The ground conductor in the form of a large-area metal plate makes possible the provision of a low resistance and low inductance ground at any desired region of the circuit board.

Preferably, an identical arrangement of first arresters, lightning protection chokes, second arresters and a network is provided, in the sequence stated, is connected to signal conductors carried by the board for each device to be protected. This promotes a high degree of decoupling between the inputs of each device and the interfering energy.

In further accordance with the invention, at least some of the signal conductors carried by the board, and connecting the arresters, the chokes and the network to the connecting means, are constructed to be melted by high intensity lightning currents, and thus to open the current paths to associated devices. For this purpose, these conductors can be given a reduced cross section or thickness at selected points where they will melt and thus interrupt their associated current paths.

The present invention will now be described with reference to the drawing figures.

BRIEF DESCRIPTION OF THE DRAWING

FIG. 4 is a pictorial perspective view of the embodiment of FIGS. 2 and 2a.

DESCRIPTION OF THE PREFERRED EMBODIMENTS

Figure 1:
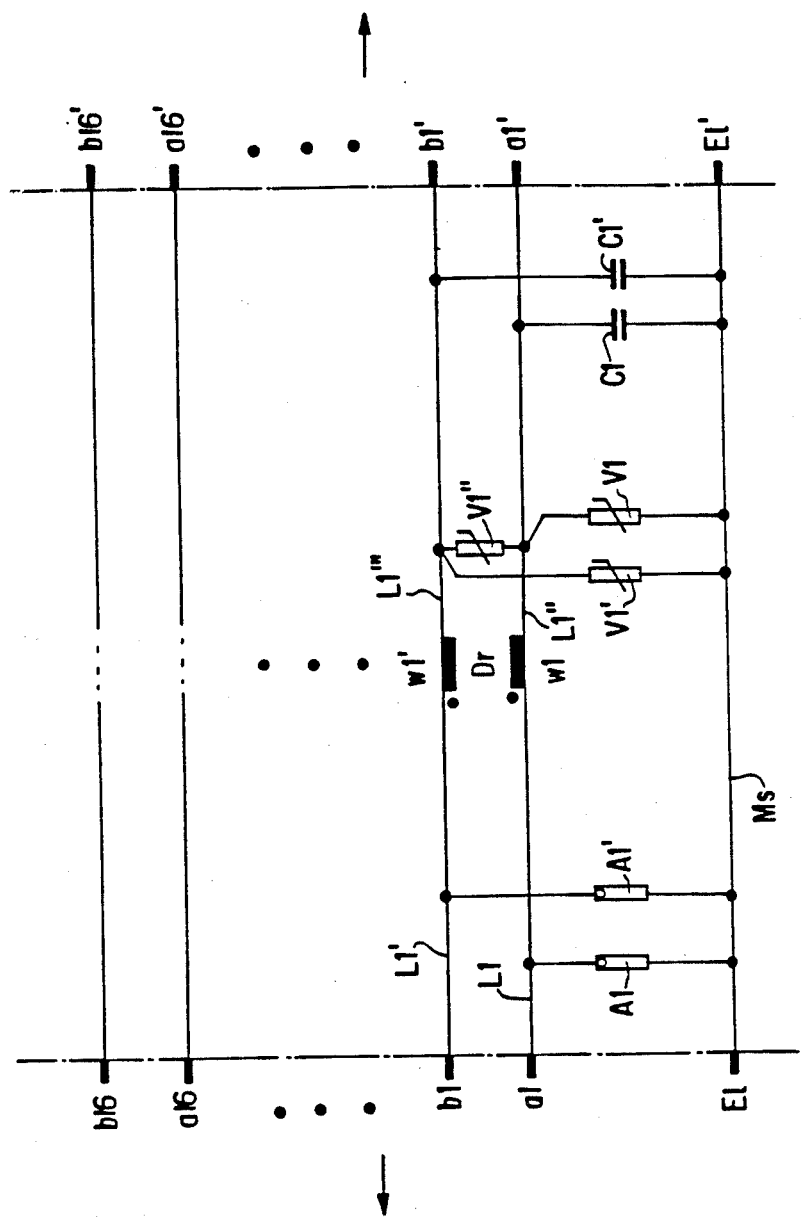
FIG. 1 is a circuit diagram of a circuit arrangement of one preferred embodiment of the protective arrangement according to the present invention.

The circuit of FIG. 1 includes transmission line terminals a1, b1 to a16, b16 and device terminals a1', b1' to a16', b16' for 16 pairs of signal conductors. All of these terminals may be plug-in connections. The transmission line terminals are located along one side of the circuit arrangement and the device terminals are along the other side thereof. A continuous ground conductor Ms connects the line side ground conductor terminal E1 with the device side ground conductor terminal E1'. Also shown are first arresters A1 and A1', a lightning protection choke Dr with windings w1 and w1', second arresters V1 and V1' and capacitors C1 and C1' which form a lowpass filter. All of the components illustrated are associated with one pair of signal conductors which include portions L1 and L1' between transmission line terminals a1, b1 and chokes Dr, and portions L1'' and L1''' between the chokes and device terminals a1' and b1'. The other sets of signal conductors may be provided with similar protective devices as required.

While arresters A1, A1', V1 and V1' and capacitors C1 and C1' are each connected between a signal conductor and ground, windings w1 and w1' of the lightning protection choke are connected serially in the paths of the signal conductors.

Downstream of the lightning protection choke, a further second overvoltage arrester V1″ for finely protecting the instrument inputs is connected between the two signal conductors of one pair. The second voltage arresters are preferably varistors having a shorter response time than the first arresters.

The windings of lightning protection choke Dr are polarized in such a manner that a signal coming from the line side Ltg to conductor a1 finds, on its path through the choke winding w1, through plug-in connection a1′ to the device to be protected and from there back through plug-in connection b1′, second winding w1′ and on through the return signal conductor b1, only the difference between the choke winding inductances, while a lightning stroke or other interfering or excess voltages arriving simultaneously in the signal conductors find the full inductance of a choke winding on each signal conductor. Each device to be protected may be an instrument.

Figure 2:
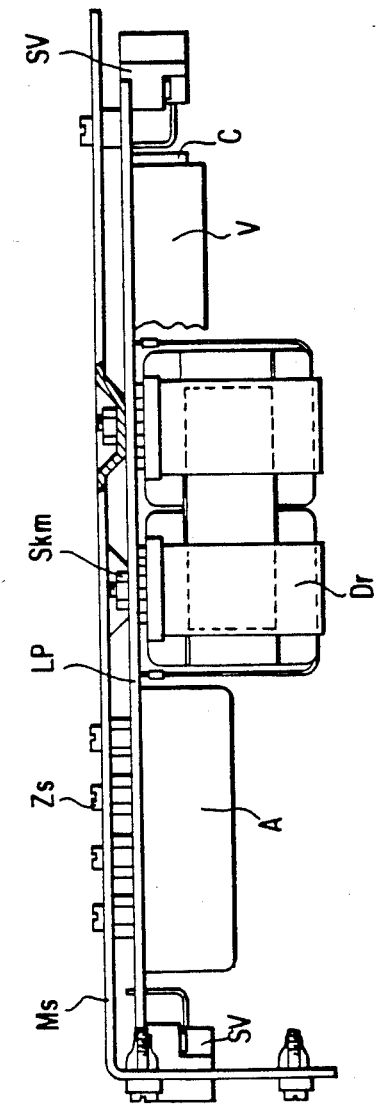
FIGS. 2 and 2a are a side elevational view and a top plan view, respectively, of one structural embodiment of the invention.

FIG. 2 is a side view of one embodiment of a protective arrangement according to the invention, i.e. a plug-in insert presenting the circuit shown in FIG. 1. A circuit board LP is equipped, proceeding in the direction from the line side Ltg to the instrument side Ger, i.e. from the left to the right between plug-in connectors SV, in strictly maintained sequence, with a first overvoltage arrester A, then with the lightning choke Dr, then with the second arresters V, and finally with capacitors C. At a small distance from the circuit board and parallel thereto there is disposed the ground plate Ms. The advantage of the ground plate is that a low resistance, low inductance ground connection can be established at practically any place on the circuit board, in that contact is made with the respective oppositely disposed ground point (e.g. machine screws Zs, hexagonal nuts Skm, etc.).

Figure 2A:
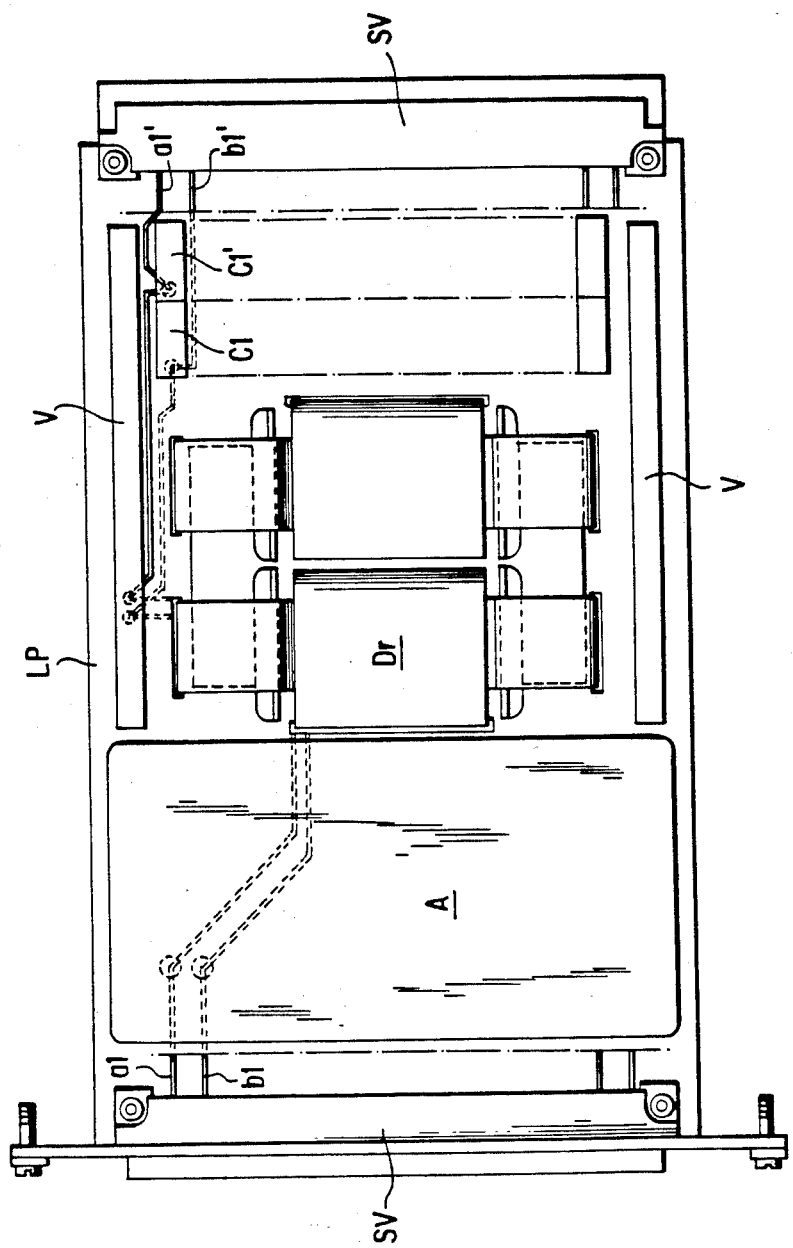

FIG. 2a is a top view of the plug insert of FIG. 2, the path of the conductors of the first signal conductor pair being shown here between plug-in connections a1, b1 and a1′, b1′ by heavy lines which are solid where they would be visible and broken where they would be hidden in representation for the remaining conductors.

Figure 3B:
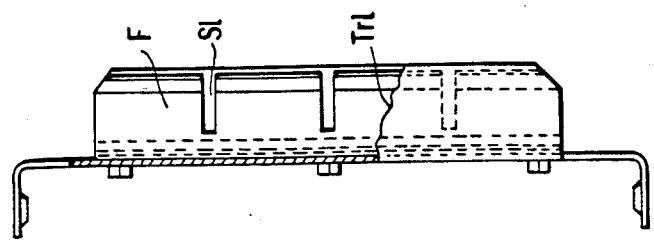
FIGS. 3a and 3b show one embodiment of a ground contact rail which can be used in embodiments of the invention.
Figure 3C:
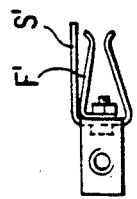
FIG. 3c is a view similar to that of FIG. 3a of a modified ground contact rail structure.
Figure 3A:
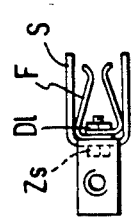

FIGS. 3a, 3b and 3c show one embodiment of a ground contact rail with which a very good, low resistance and low inductance contact can be made.

FIG. 3a shows such a ground contact rail in end view. A contact spring F which is bent in approximately the shape of a horse shoe and a protective rail S surrounding it are shown here. By means of machine screws Zs and a pressure tongue D1 secured by screws Zs, spring F and rail S are connected together in a force locking manner. If the ground plate Ms is inserted between the two spring tongues of contact spring F, the latter are pressed apart and thus provide good contact.

FIG. 3b is a side view of the contact rail, with one-half of rail S and spring F being cut away above a parting line Tr1 so that the rear half of the contact spring and the rear half of the rail are open to view. FIG. 3b shows slits S1 in contact spring F. With these slits it is assured that contact spring F can be adapted to local unevennesses in the ground rail and thus good contact is available.

FIG. 3c shows a ground contact rail in a slightly modified form where the contact spring F′ has only one tongue and the portion of rail S′ on the opposite side is designed in the form of a cooperating spring tongue, with the ground plate Ms being insertable between the latter rail side and spring F′.

Sliding arresters as disclosed in German Patent Applications Nos. P 31 013 53.8-32 and P 31 013 54.6-32 are excellently suitable as arresters A to provide coarse, or basic protection.

Great advantages are realized in the arrangement according to the present invention if a multiple electrode varistor as disclosed in German Patent Application Nos. P 31 40 802 and G 81 30 023 is employed for each arrester V. These publications disclose, in addition to equipping individual signal conductors with varistors connected to ground, varistors between adjacent signal conductors.

The lightning protection choke is advantageously a transformer with foil coil, with the foil coil assuring, because of the parallel arrangement of the individual signal conductors, high uniformity of winding inductance and thus a disappearingly low forward attenuation for each individual signal as well as high decoupling attenuation between individual signals.

A further advantage of the foil coil in the lightning protection choke is that during assembly of the circuit board, the danger of accidentally interchanging individual signal conductors is practically excluded.

FIG. 4 is a pictorial perspective view of a connecting insert like that of FIGS. 2, 2a, with the individual components being identified by the same reference numerals.

According to a further optimum embodiment, the metal grounding plate Ms has the same dimensions as the circuit board and is insertable like the latter. In addition, the metal plate serves to shield adjacent components.

It will be understood that the above description of the present invention is susceptible to various modifications, changes and adaptations, and the same are intended to be comprehended within the meaning and range of equivalents of the appended claims.

What is claimed is:

1. In an arrangement for protecting devices connected to transmission lines against excess or interfering voltages resulting from lightning strokes and the action of EMP or EMI, which arrangement includes first connecting means for establishing connections with such transmission lines, second connecting means for establishing connections with the devices, a ground conductor extending between the first and second connecting means, lightning protection chokes connected in series between the first and second connecting means to be interposed between the transmission lines and the devices, first excess voltage arresters connected to the connecting means for effecting coarse overvoltage protection for the devices, second excess voltage arresters connected to the connecting means for effecting fine overvoltage protection for the devices, and a network with frequency dependent behavior connected to the second connecting means and located between the second connecting means and the second excess voltage arresters, the improvement wherein: said arrangement further comprises a circuit board carrying said arresters, said chokes and said network; said ground conductor is constituted by a large-area metal plate oriented parallel to said circuit board; said first excess voltage arresters are constructed to carry lightning-induced current; said first and second excess voltage arresters, said chokes and said network cooperate for protecting the devices against EMI influences; said first and second connecting means are disposed at respectively opposite sides of said circuit board; and, in the direction from said first connecting means to said second connecting means, there are arranged, in the order recited and close to one another, said first excess voltage arresters, said lightning protection chokes, said second excess voltage arresters and said network.

2. An arrangement as defined in claim 1 wherein: each said connecting means includes a ground connector and a plurality of non-grounded connectors; said arrangement further comprises at least one conductor connected between a non-grounded connector of said first connecting means and one side of at least one said first excess voltage arrester, and at least one conductor connected between a non-grounded conductor of said second connecting means and one said lightning protection choke; and each said conductor is constructed to be melted, and thus broken, by a lightning-induced current.

3. An arrangement as defined in claim 2 wherein each said conductor has a region of reduced thickness where it will be melted by such lightning-induced current.

4. An arrangement as defined in claim 1 wherein each said connecting means comprises a plurality of plug-in connector elements.

5. An arrangement as defined in claim 4 wherein said circuit board is constructed to be installed by being plugged in to a housing.

6. An arrangement as defined in claim 1 wherein: at least one said connecting means comprises a ground conductor; and said arrangement further comprises a contact rail connecting said metal plate to said ground conductor.

7. An arrangement as defined in claim 1 wherein there are two said lightning protection chokes associated with one device and positioned so that they are inductively coupled together with their windings poled in the same direction.

8. An arrangement as defined in claim 1 wherein: said second connecting means comprises a ground conductor and a signal conductor; and said network comprises at least one lowpass filter including a capacitor connected to said second connecting means for connection to one such device and having one side connected to said ground conductor.

9. An arrangement as defined in claim 1 wherein a plurality of devices is to be protected, there is a plurality of pairs of said chokes each associated with a respective device, and said chokes of each said pair are inductively coupled together with their windings poled in the same direction.

10. An arrangement as defined in claim 9 wherein said chokes constitute multiple foil windings of a transformer.

11. An arrangement as defined in claim 1 wherein: one device is connected to two ungrounded transmission lines via two of said lightning protection chokes; said second connecting means comprise two connectors each connected to a respective one of said two chokes; and further comprising a further excess voltage arrester for effecting fine protection connected between said connectors and located between said chokes and said second connecting means.

12. An arrangement as defined in claim 1 wherein said metal plate serves as a shielding for adjacent components.

* * * * *